United States Patent [19]

Ojima

[11] Patent Number: 4,472,161
[45] Date of Patent: Sep. 18, 1984

[54] TENSION PROVIDING MECHANISM

[75] Inventor: Juji Ojima, Ebina, Japan

[73] Assignee: NHK Spring Co., Ltd., Yokohama, Japan

[21] Appl. No.: 239,989

[22] Filed: Mar. 3, 1981

[51] Int. Cl.³ ............... F16H 7/12; F16H 7/18; F16D 65/38

[52] U.S. Cl. ............... 474/111; 474/140; 474/138; 188/196 F; 188/196 V

[58] Field of Search ............ 474/111, 140, 136, 138; 74/99 A; 188/196 E, 196 V

[56] References Cited

U.S. PATENT DOCUMENTS

| | | | |
|---|---|---|---|
| 968,377 | 8/1910 | Marco | 188/196 F |
| 4,371,360 | 2/1983 | Ojima et al. | 474/111 |

FOREIGN PATENT DOCUMENTS 4515773  6/1970  Japan .

Primary Examiner—Lawrence J. Staar
Assistant Examiner—Michael D. Bednarek
Attorney, Agent, or Firm—Fleit, Jacobson, Cohn & Price

[57] ABSTRACT

A first shaft is screwed with a second shaft. The first shaft is secured rotatively to a bearing through a spring and the second shaft is secured slidably to another bearing. A pushing force in a fixed direction is provided to the second shaft through the screwed portion by actuating a spring torque in a rotative direction to the first shaft, whereby a determined tension is given to a chain when a tensioner is slackened in use.

2 Claims, 4 Drawing Figures

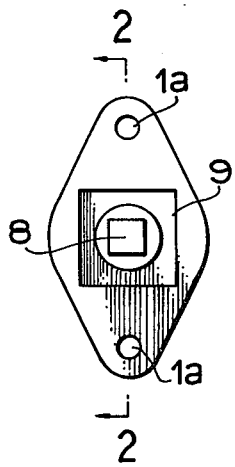
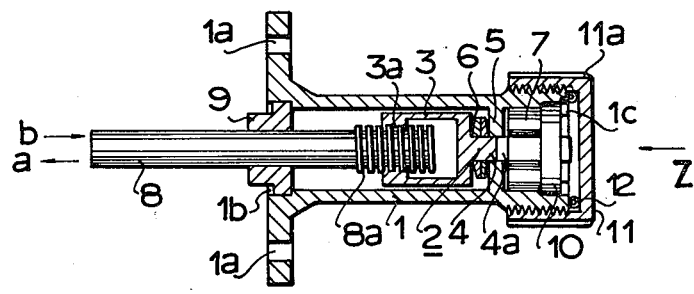
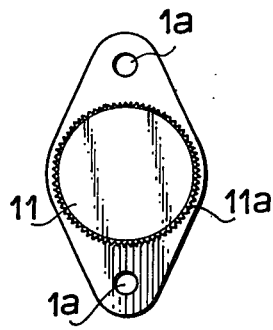

4,472,161

TENSION PROVIDING MECHANISM

BACKGROUND OF THE INVENTION

This invention relates to a mechanism for providing tension, that is, a mechanism wherein a pushing force continuously acts in a first direction and, when a reaction force acts, the mechanism displays nearly properties of rigid body. Such kind of mechanism is used in such a case when a chain or a belt is pressed with a force having a fixed direction, for instance, in chain tensioner, belt tensioner or the like, and in case wherein characteristics of the rigid body are required when a reaction force against said fixed direction acts on said tensioner. In other words, the chain tensioner is used to provide a fixed tension to a chain by pressing said chain in the fixed direction when said chain occurs the slackness by elongation or wear of the chain during the use. In this case, the characteristics of nearly the rigid body are desirable for the reaction force against said pressing direction.

Heretofore, for instance, in case of the chain tensioner, the readjustment thereof is performed with manpower according to the elongation of the chain or automatically. The former, however, is comparatively cheap, but difficult in maintenance and has such defects as noise due to the reason that the former becomes a perfect rigid body in the direction of the reaction force and the intense wear of the tensioner unendurable to the use for long period of time etc. On the other hand, the latter is complicated in whole mechanism and high cost since the oil pressure or the like is used.

SUMMARY OF THE INVENTION

This invention is performed in view of these points, and intends to provide a novel tension providing mechanism using a spring torque, without maintenance being required during long use, together with ensuring a suitable pushing force in spite of a simple construction.

BRIEF DESCRIPTION OF THE DRAWINGS

FIG. 1 is a plan view of a tension providing mechanism in accordance with this invention.

FIG. 2 is a side view of longitudinal section taken on line 2—2 of FIG. 1.

FIG. 3 is a section taken in the direction of the arrow Z of FIG. 2.

DETAILED DESCRIPTION OF THE INVENTION

Figure 4:
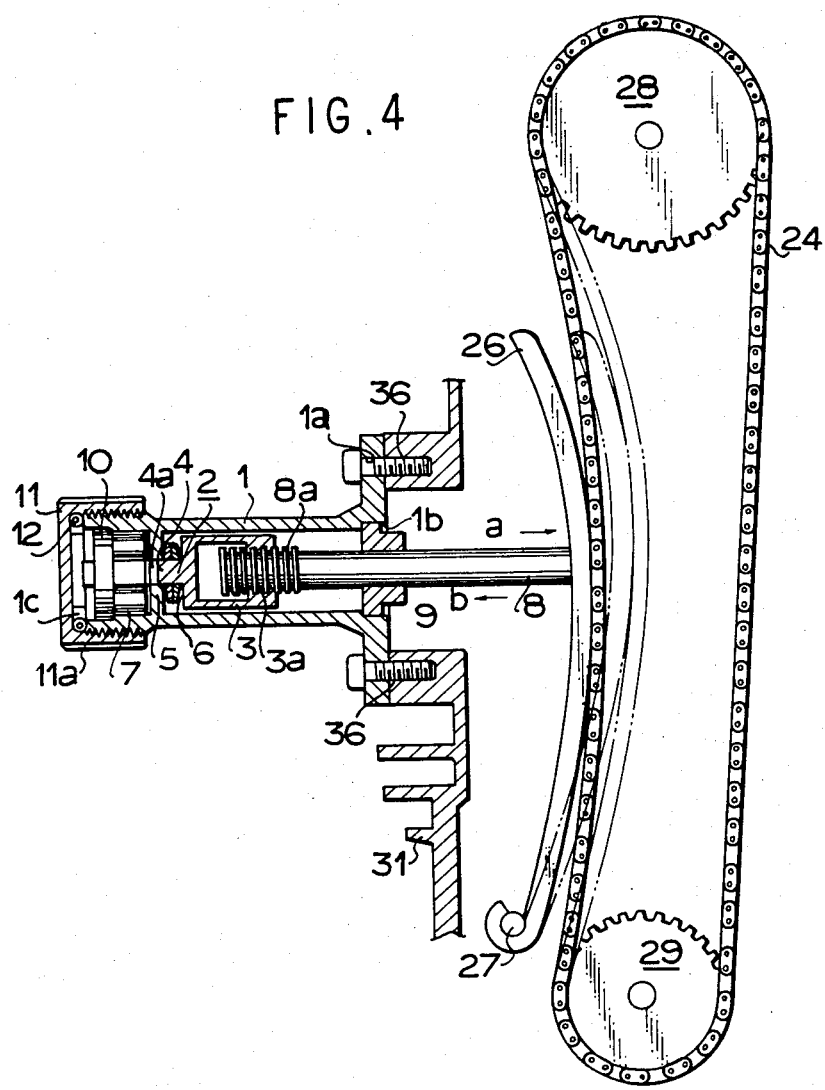
FIG. 4 is a side view which shows a status of use of this device. Referring to the example shown in the drawings, the use of this invention will be explained as follows.

The numeral 1 is a cylindrical case, wherein an attaching piece is formed at the bottom thereof, said attaching piece being fixed to a fixed member 31 with a screw 36 or the like, as illustrated in FIG. 4, through an attaching hole 1a of said attaching piece. The numeral 2 is a shaft consisted of a head portion 3 having a nearly U type sectional area and an axially-extending portion 4. At the inner surface of the open end of said head portion 3 and the end portion of said axial portion 4, a female screw portion 3a and a slit groove 4a are formed, respectively. Said axial portion 4 is secured rotatively to a bearing 5 projected toward the inner walls of said cylindrical case 1 and restrains the sliding in the direction of the axial line by the aid of a belleville spring 6. The spring 6 surrounds the axial portion 4 between the bottom of the head portion 3 and the bearing 5. A spiral spring 7 is fixedly inserted in the case 1, with the inner end thereof secured to the slit groove 4a and the outer end thereof suitably fixed to the cylindrical case 1.

The numeral 8 is a shaft having a square area which is slidably inserted into a square perforated hole 9a of a bush 9 engaged with a square step 1b formed at the bottom of the cylindrical case 1 (The shaft 8 is restrained from rotation.), and a male portion 8a formed at the end portion thereof is screwed with the female portion of the shaft 2. The numeral 10 is a stopper, wherein the middle portion thereof is screwed with the slit groove 4a of the shaft 2, and prevents the rotation of the shaft 2 by screwing the both ends thereof with grooves 1c and 10c formed at the inner wall of the head portion of said cylindrical case 1 respectively.

Further, at the head portion of the cylindrical case 1, a cap 11 is screwed through an O ring 12 at the end portion of the cylindrical case. Furthermore, 11a is a knurling having flat grooves formed at the outer wall of the cap 11.

In said example, the female and the male screw portions, 3a and 8a, are formed on the shaft 2 and shaft 8, respectively. However, it is needless to say that said screw portions 8a and 3a may be formed reversely on shaft 2 and 8 respectively.

In said constitution, after removing the cap 11 and then stopper 10, said shaft 2 is allowed to forcedly rotate in the winding direction of the spiral spring 7 by inserting a driver or the like into said slit groove 4a. The shaft 8 slides in the direction shown by arrow a or b (second direction) in accordance with this forced rotation (through the screw portions 3a and 8a). The sliding direction of this shaft 8 is determined by the difference of a clockwise or a counter clockwise screw of the screw portion 3a or 8a. After winding the spiral spring 7 properly by said forced rotation, engaging the stopper 10 with the fixed position to prevent the rotation of the shaft 2 in the reeling back direction, this mechanism is set at the determined position, for instance, as a chain tensioner. After setting, when the stopper 10 is removed, the shaft 2 is energetically rotated in the reeling back direction by the action of initial torque of the spiral spring 7 in accordance with said forced rotation and a pushing force in a first or pressing direction is provided to the shaft 8 through the screw portions 3a and 8a, whereby the shaft 8 slides in the pressing direction (counter direction against said forced rotation), for instance, in the direction a. The pushing force of the shaft 8 in the direction a acts, for instance, in a direction to press on a tensioner 26 having one end pivoted at 27 to thereby provide a given tension to a chain 24 passing around sprockets 28 and 29, thereby maintaining the chain in a slackless state. When the reaction force (b direction) over this pushing force acts on shaft 8, the belleville spring 6 is slackened to display the damper effect. However, even if said reaction force becomes greater the belleville spring 6 holds a closely contact state, whereby the shaft 8 does not slide further in direction of the reaction force (becomes a rigid body).

On the contrary, when said reaction force is less than the pushing force of shaft 8, even if a little, (for instance, when the tension state of the chain is slackened, even if a little) the shaft 8 slides in the direction a immediately to maintain the chain 24 always in tension state, without slackness, since the pushing force in the direction a is provided to the shaft 8 by the spring torque of the spiral spring 7 through shaft 2.

Further, when a constant force spiral spring is used, the pushing force given to the shaft 8 can be always held to be constant.

Furthermore, the cap 11 displays the effect of the oil seal together with O ring 12.

In the above mentioned example, the belleville spring 6 is used as an object to obtain the damper effect against the reaction force. However, it is needless to say that this invention is not limited by this example, but a coil properly designed or the like can be used.

Further, the positioning of the spring 6 in the above example is suitable for providing a pushing force in the direction shown with arrow a, but in a mechanism which provides the pushing force in the direction shown by b against the counter direction thereof the position of said spring can be changed in design suitably so as to display the damper effect when said spring 6 is subjected to the reaction force in the direction shown by a.

According to the tension providing mechanism in accordance with this invention a proper pushing force can be secured, in spite of very simple structure providing the spring torque.

Further, when the reaction force acts over said pushing force, a proper slack allowance (damper effect) is set up to increase the abrasion proof before the rigid body is constituted, thereby being able to prevent a shocking sound effectively and to endure the long use. Furthermore, since the spring torque is always actuated, the member 26 is continuously provided with the pushing force and the maintenance becomes unnecessary. Therefore, when this mechanism is adopted as a tensioner in chain, belt or the like, the effect is remarkable.

What we claim:

1. A tension providing mechanism comprising:
   a casing;
   a first shaft rotatably supported within said casing for limited axial translation with respect to said casing;
   a second shaft nonrotatably supported for translation with respect to said casing, said second shaft having an end portion extending from the casing for engagement with an object to be subjected to a tension force, said first end said second shafts being threadedly engaged with each other so that rotation of said first shaft results in in translation of said second shaft;
   spring means for biasing said first shaft for movement in the tension producing direction, said spring means resisting axial translation of the first shaft in a direction opposite to said tension producing direction when a reaction force greater than the tension force is applied to said second shaft in a direction opposite to the tension producing direction, thereby absorbing said reaction force;
   means for preventing rotation of said second shaft while allowing translation thereof; and
   biasing means for exerting a biasing force on said first shaft so that said first shaft tends to rotate relative to said second shaft whereby said first shaft exerts a force on said second shaft tending to translate said second shaft in a direction to provide the tension force.

2. A tension providing mechanism comprising:
   a casing;
   a first shaft rotatably supported within said casing;
   a second shaft supported for translation with respect to said casing, said second shaft having an end portion extending from the casing for engagement with an object to be subjected to a tension force, said first and said second shafts being threadedly engaged with each other so that rotation of said first shaft results in translation of said second shaft;
   means for preventing rotation of said second shaft while allowing translation thereof;
   biasing means for exerting a biasing force on said first shaft so that said first shaft tends to rotate relative to said second shaft whereby said first shaft exerts a force on said second shaft tending to translate said second shaft in a direction to provide the tension force;
   wherein one end of said first shaft comprises a generally U-shaped end portion encompassing an end portion of said second shaft and having threads for threadedly engaging the encompassed end portion, and a slitted, axially-extending opposite end portion;
   wherein said biasing means comprises a constant force spiral spring having one end secured to the slitted end portion of said first shaft and the other end secured to said casing;
   said casing including supporting means for rotatably supporting the slitted end portion of said first shaft and for limiting translation of said first shaft with respect to said casing; and
   wherein said mechanism further comprises spring means which is positioned between said supporting means and said U-shaped end portion for exerting a biasing force on said first shaft in the tension producing direction when said first shaft is adjacent said supporting means, and stopper means engageable with said slitted end portion and said casing for preventing rotation of said first shaft relative to said casing, said stopper means being removably engageable with said casing so that the slitted end portion is rotatable to tension the spiral spring and being removably engageable with the slitted end to permit the spiral spring to unwind to rotate the first shaft whereby the second shaft translates and applies the tension force.

* * * * *